United States Patent [19]

Raidel

[11] 4,278,271

[45] Jul. 14, 1981

[54] SUSPENSION SYSTEM WITH CENTRAL ELASTOMER SPRING

[76] Inventor: John E. Raidel, Rte. 9, Box 400-M, Springfield, Mo. 65804

[21] Appl. No.: 113,472

[22] Filed: Jan. 21, 1980

[51] Int. Cl.³ .............................................. B60G 5/00
[52] U.S. Cl. .................................. 280/687; 267/21 R
[58] Field of Search ............ 280/687, 685; 267/21 R, 267/63 R, 63 A

[56] References Cited

U.S. PATENT DOCUMENTS

| | | | |
|---|---|---|---|
| 3,471,165 | 10/1969 | Raidel | 280/687 |
| 3,572,745 | 3/1971 | Willets | 280/687 |
| 3,632,128 | 1/1972 | Raidel | 280/687 |

Primary Examiner—Robert R. Song
Attorney, Agent, or Firm—Rogers, Eilers & Howell

[57] ABSTRACT

A tandem axle vehicle suspension system has a pedestal mounted to a chassis member and extending downwardly to support a trunnion shaft extending the width of the vehicle and between two suspension systems. A compensator is pivotally attached to the trunnion shaft. A fore torque beam and a rear torque beam are pivotally attached to and extend between the compensator and an axle. A central, principal load-bearing elastomer spring is held in position between the upper portions of the torque beams with sandwich type secondary springs extending between the compensator and each torque beam. In one embodiment, a mounting stud extends into the cylindrical opening at each end of the elastomer spring to hold it in position. In an alternate embodiment, fiber block assemblies are mounted to each end of the elastomer spring and opposing U-shaped saddle brackets with arcuate slots capture each end of the spring and permit limited arcuate movement of each end of the spring with respect to its adjacent torque beam.

17 Claims, 6 Drawing Figures

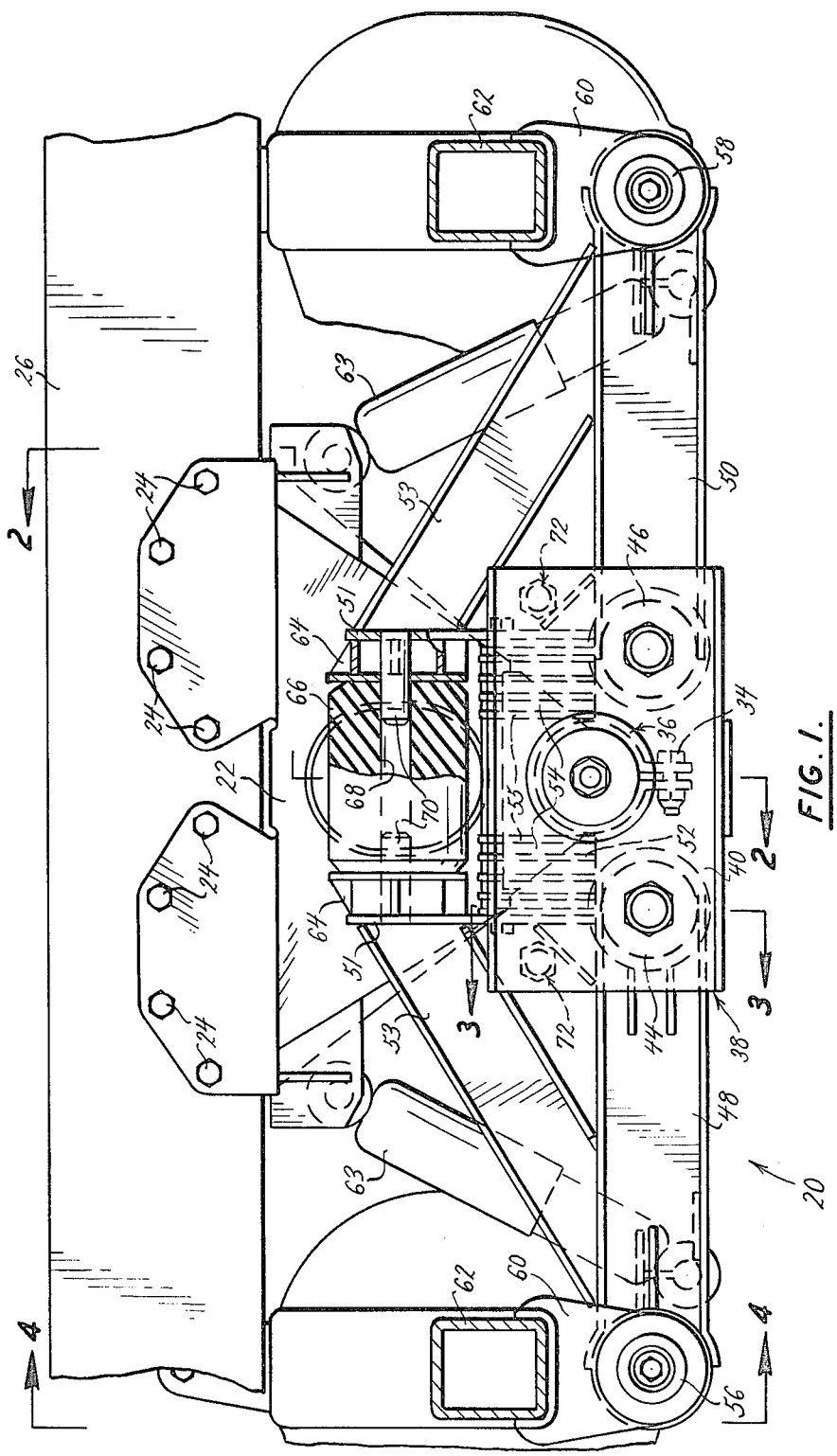

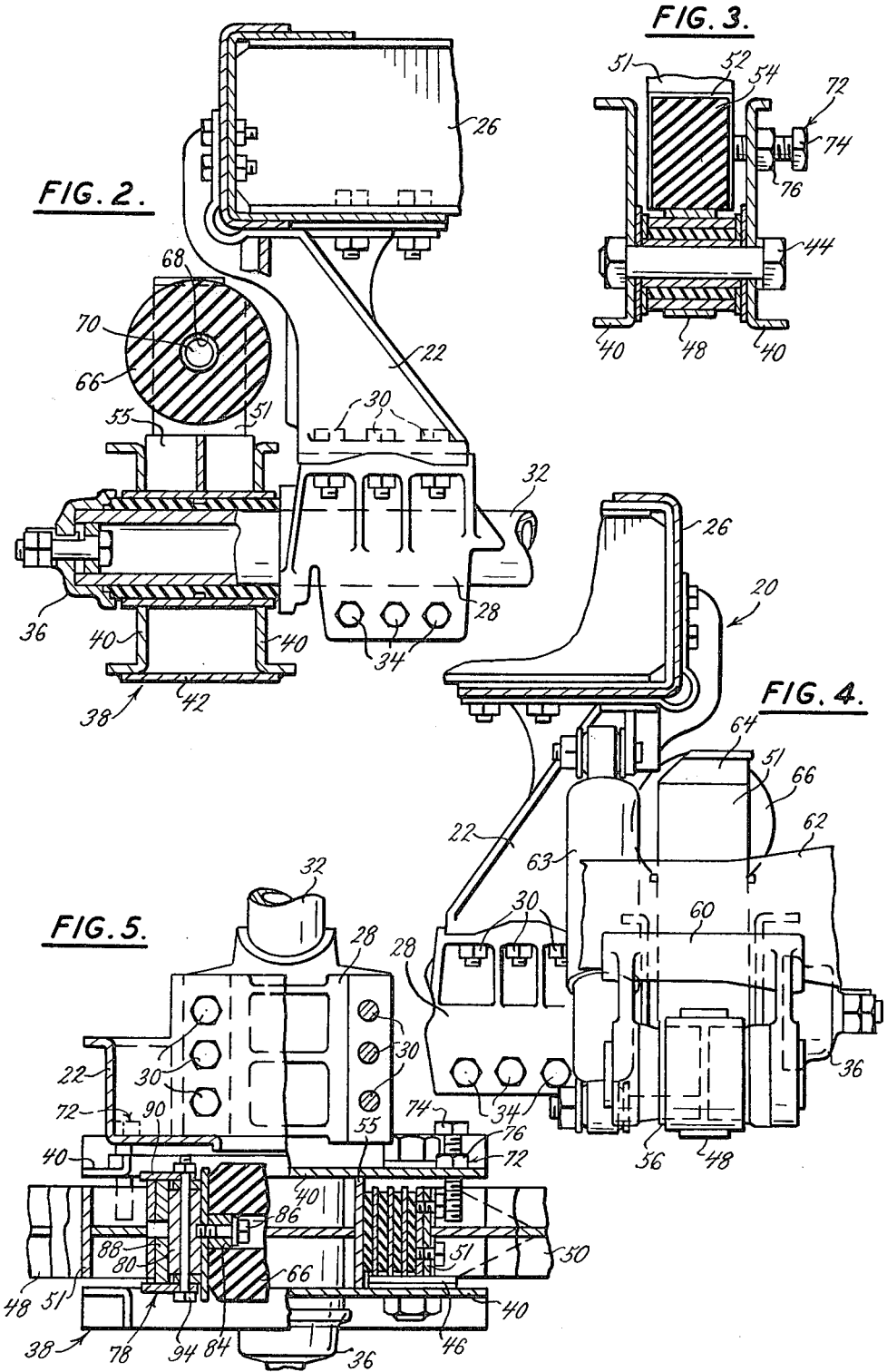

SUSPENSION SYSTEM WITH CENTRAL ELASTOMER SPRING

BACKGROUND AND SUMMARY

Tandem axle suspensions are available in the prior art and generally include a pair of heavy duty springs to resist movement of the axles in the vertical direction with respect to the frame of the vehicles. In addition, some suspension systems provide structure to help balance the load between the axles to thereby improve the braking characteristics and wheel contact resulting in a much safer and more comfortable ride. Applicant has designed and patented several of these systems, including U.S. Pat. Nos. 3,471,165 and 3,632,128, the disclosures of which are incorporated herein by reference. These patented suspension systems are highly successful and provide a pair of sandwich type heavy duty load springs which extend between torque beams and a compensator. In at least one of the embodiments of U.S. Pat. No. 3,632,128, a smaller sandwich type spring is mounted between vertical plates projecting upwardly from the torque beams, these springs being of reduced capacity and providing for translation of effective loading from one axle to the other.

Applicant's prior suspension systems are designed and manufactured to operate many hundreds of thousands of miles without any maintenance. However, when it eventually is necessary to perform an overhaul on these suspensions, the main springs must be removed and replaced. The effort required to replace the springs of applicant's prior art suspensions is significantly reduced over that of other prior art suspensions but still requires that the suspension be dismantled from the vehicle and disassembled, and the compensator at least partially disassembled. This procedure is relatively easy to perform and applicant's suspensions are significantly easier to maintain and substitute replacement springs than other prior art suspension systems.

To reduce even the small amount of time required in applicant's previous suspensions, applicant has developed a new suspension system which has a single heavy duty spring member which can be removed and replaced in only a fraction of the time required for other suspensions and which provides the same features of his prior art systems and more. Applicant's new suspension utilizes a central, horizontally disposed, principal load-bearing spring member which extends between two pivotally mounted torque beams. A smaller compensator is mounted to a trunnion shaft and includes a pair of sandwich type elastomer and steel plate springs extending between the compensator and the torque beams to dampen the deflection of the central spring. The capacity of the suspension and the degree of deflection may be adjusted by choosing the stiffness of springs used. Because the central spring is "free-floating" between the two pivotally mounted torque beams, it also helps balance an uneven loading between the axles along with the compensator assembly. An unbalanced load at one axle shifts the central spring and compensator assembly both to distribute the load evenly between the axles.

In a first embodiment, the central spring is mounted between the torque beams by a mounting stud at each torque beam which extends into an axial cylindrical opening extending the length of the spring. The axial opening also provides room for the expansion of the elastomer as it is compressed under load by the torque beams. Each end of the spring is fixed with respect to its adjacent torque beam except for distortion occurring in the elastomeric material. In the second embodiment, the ends of the spring are permitted to "float" or pivot within a limited range. In this embodiment, self lubricating, convex fiber blocks are positioned adjacent each spring end and a matching, concave fiber surface is affixed to each torque beam. Opposing U-shaped saddle brackets with an aligned arcuate slot and stop bolt secure each spring end to its adjacent torque beam so that the spring end may pivot with respect to the torque beam. Movement is limited however by the arcuate slot and stop bolt.

Applicant's principal central spring may be replaced merely by removing a pair of set screw stops, elevating the vehicle chassis and merely lifting the central spring means out from between two mounting studs and replacing it with a new one. The set screw stops prevent unintended removal or cocking of the central spring when the vehicle is jacked up for other purposes. In a second embodiment, two more bolts must be loosened, but it is still possible to replace the single principal spring without disassembling the suspension system, removing it from the vehicle, or even partial disassembly of the compensator.

Thus, applicant's suspension provides for quick and easy removal and replacement of the central, principal load-bearing spring and an increased ability to distribute an unbalanced load equally between the axles.

BRIEF DESCRIPTION OF THE DRAWINGS

FIG. 1 is a side view of applicant's suspension system shown mounted to the chassis and axles of the vehicle.

FIG. 2 is a cross-sectional view taken along the plane of Line 2—2 in FIG. 1, and detailing the pedestal and torsion bar.

FIG. 3 is a cross-sectional view taken along the Line of 3—3 in FIG. 1 and detailing the set screw stop.

FIG. 4 is a front view of applicant's suspension system taken along the plane of Line 4—4 in FIG. 1.

FIG. 5 is a cross-sectional view taken along the plane of Line 5—5 in FIG. 6 and detailing the alternate mounting of the central spring.

DETAILED DESCRIPTION OF THE PREFERRED EMBODIMENT

Figure 6:
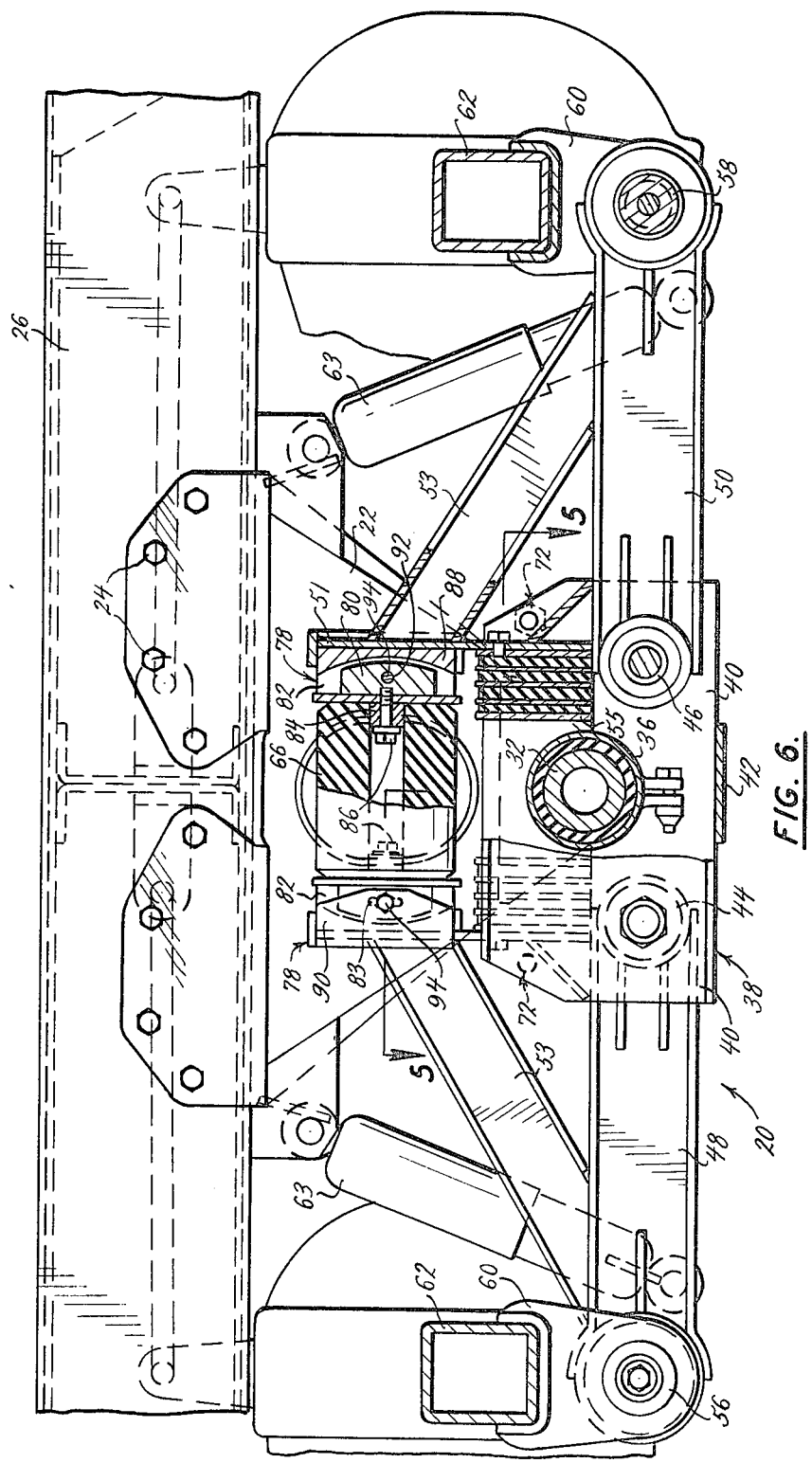
FIG. 6 is a side view of the second embodiment of applicant's suspension with the alternate mounting of the center spring.

Applicant's preferred embodiment of a suspension system with central elastomer spring 20, as shown in FIGS. 1 through 4, includes a pedestal 22 fastened by a plurality of bolts 24 to a truck chassis member 26. A cast bracket 28 is mounted to the lower end of pedestal 22 by a plurality of bolts 30. The cast bracket 28 extends around and is bolted to a trunnion shaft 32 by bolts 34. The trunnion shaft 32 extends the width of the truck body to another suspension system (not shown) on the opposite side of the truck. A bushing assembly 36 is mounted on the trunnion shaft 32 outwardly of the cast bracket 28 and supports a compensator assembly 38.

The compensator assembly 38 includes a pair of parallel side brackets 40 mounted to the bushing assembly 36 and a lower bottom plate 42. Bushings 44, 46 pivotally mount a fore and an aft torque beam 48, 50, respectively, to the compensator 38. Each torque beam 48, 50 is triangular shaped with vertical brackets 51 extending upwardly between parallel side brackets 40. Gusset plates 53 strengthen torque beams 48, 50, as is known in the art. A pair of sandwich type, steel and elastomer springs 52, 54 extend between each torque beam 48, 50 and the compensator assembly 38 with end plates 55 welded to parallel brackets 40 and vertical bracket 51. Bushings 56, 58 are mounted to the axle brackets 60 and pivotally support the front end of the fore torque beam 48, and the rear end of the aft torque beam 50, respectively, from the axles 62. A pair of self-contained shock absorbers 63 extend between the torque beams 48, 50 and the pedestal 22.

The above components have been shown and described generally, as would be readily understood by one of ordinary skill in the art. Further detail for individual assemblies such as the bushings, pedestal mounting, sandwich elastomer spring construction, trunnion shaft bushing assembly and mounting, and other components are more completely described and explained in applicant's previous U.S. Pat. Nos. 3,471,165 and 3,632,128 the disclosures of which are incorporated herein by reference.

As shown in FIG. 1, each torque beam 48, 50 has a mounting bracket 64 welded to the top of vertical bracket 51 to receive an end of the central elastomer spring 66. The central elastomer spring 66 is generally cylindrical in shape with tapered ends and has an axial cylindrical opening 68 extending therethrough. A mounting stud 70 is secured to each of the mounting brackets 64 and extends into the axial opening 68 to fix the central elastomer spring 66 into position. Although applicant discloses an elastomeric central spring 66, any type of load-bearing spring may be used, as is known in the art.

A pair of set screw stops 72 include a bolt 74 and a fastening nut 76 which attaches the bolt 74 through and to a parallel side bracket 40 of the compensator assembly 38. As is shown in FIG. 1 and FIG. 3, bolt 74 of set screw stop 72 extends inwardly beyond the edge of vertical brackets 51 and restricts the downward pivotal movement of torque beams 50 about bushings 44, 46.

OPERATION OF THE FIRST EMBODIMENT OF FIGS. 1-4

The suspension assembly 20 shown in FIGS. 1-4 is provided on both sides of a truck chassis 26 with the trunnion shaft 32 extending the width of the truck and being common for both of the suspension assemblies.

As in applicant's other suspension assemblies, including the present one, its function is to resiliently support varying loads carried by the vehicle body above the vehicle chassis 26, to respond to uneven distributions of loads either forwardly or rearwardly of the vehicle chassis, to compensate for such uneven distribution and distribute such loads substantially equally to both axles 62, and to react to and dampen individual shock forces applied to either axle 62 by rough or uneven spots in the roadway. In addition, the present suspension assembly 20 provides a single elastomeric spring 66 which is mounted between two opposing torque beams pivotally mounted at the axles and at the compensator member so that upward movement of either axle with respect to the chassis creates a moment of torque about the compensator and a compressive force against the central elastomer spring. Simultaneously, vertical movement of the axle creates a smaller turning moment of torque of greater compressive force which is absorbed by the sandwich elastomer springs mounted between each torque beam and the compensator. Thus, the vertical movement of a single axle, indicating an increased load at that axle, puts a compressive load on the central elastomer spring and compensator, tending to shift the load to the opposite axle and thereby equally distribute the load between the axles. The sandwich elastomer springs may be chosen to be of sufficient resiliency to dampen the movement of each torque arm and prevent the central elastomer spring from reacting too quickly and with too much deflection to adversely affect the stability of the suspension.

The central elastomer spring 66 may be easily installed or removed from the suspension 20 by merely retracting the bolt 74 of set screw stops 72, jacking or elevating the chassis 26 with respect to axles 62 thereby permitting each torque beam 48, 50 to pivot downwardly about bushings 44, 46 and open the "jaws" of the mounting brackets 64. This opening motion retracts the mounting studs 70 from within the axial cylindrical openings 68 and the central elastomer spring 66 may then be lifted from its position. A new central elastomer spring 66 may be placed in position, the vehicle chassis 26 lowered so that torque beams 48, 50 rotate upwardly, and bolts 74 repositioned so as to capture the torque beams 48, 50 and prevent accidental loss of the spring 66.

As can be appreciated, this replacement procedure represents a considerable time saving over the previously required removal of the suspension system and partial disassembly thereof to replace the load-bearing members.

ALTERNATE EMBODIMENT OF FIGS. 5 AND 6

As shown in FIGS. 5 and 6, applicant's suspension system 20 may also be provided with an alternate mounting structure for the central elastomer spring 66. This alternate mounting provides for a limited amount of pivotal movement between the end of the spring and its mount. A fiber block assembly 78 includes a self-lubricating fiber block 80, a U-shaped saddle mounting bracket 82, with an arcuate slot 83 therein mounted on vertical bracket 51, a positioning pin 84 and a bolt 86 which attaches the positioning pin 84 to the saddle bracket 82 and fiber block 80. This is best shown in the cutaway of FIG. 6. A matching concave fiber surface 88 is secured to an opposing U-shaped saddle bracket 90 and has a threaded hole 92 therein. A bolt 94 screws into hole 92 until it extends into arcuate slot 83 in the first saddle bracket 82 to capture the first fiber block assembly 78 and limit its travel. Thus, each end of spring 66 has a first fiber block assembly 78 secured thereto by inserting the position pin 84 and bolt 86 into axial opening 68. The spring 66 is then secured at each end by threading bolt 94 through hole 92 and into arcuate slot 83 in bracket 82.

OPERATION OF THE ALTERNATE EMBODIMENT OF FIGS. 5 AND 6

Applicant's alternate embodiment provides for movement between the ends of the central spring 66 and the mounting brackets 90 secured to the torque beams 48, 50. As is shown in the drawings and is described above, fiber block assemblies 78 are attached to the ends of the springs 66 and are held in position by bolts 94 which extend through arcuate slots 83.

In this embodiment, the relative position of the fiber block 80 may change with respect to its matching fiber surface 88 as an unbalanced load is experienced. For example, if the forward axle is moved upward relative to the chassis, indicating an increased load at that point, the fore torque beam 48 would pivot upwardly about bushing 44. The upper end of fore torque beam 48 would push rearwardly against the central spring 66, thereby causing fiber surface 88 to slide upwardly with respect to fiber block 80. The load would then be transmitted through the central spring 66 and balance the load at the other axle. A similar action would also take place through the compensator assembly 38 and sandwich spring 52.

Because bolts 94 effectively capture the central spring 66, the set screw stop 72 is not required in this embodiment of applicant's suspension. Removal of the central spring 66 from this embodiment may be effected by removing bolts 94, raising the chassis 26 with respect to the axles 62, and lifting up the central spring 66.

Both embodiments of applicant's invention provide superior braking characteristics, load sharing capability, and ease of maintenance including spring replacement heretofore not attainable with the prior art suspensions. Various changes and modifications have been suggested by applicant and there are others which would be apparent to one of ordinary skill in the art. These are included in the teaching of applicant's invention and applicant's invention should be limited only by the scope of the claims appended hereto.

What is claimed is:

1. A vehicle suspension assembly for a tandem axle vehicle including a pedestal adapted to be suspended from said vehicle's chassis and between said axles, a compensator pivotally connected to said pedestal, a first torque beam pivotally connected at an end to the fore axle and pivotally connected at its other end to said compensator, a second torque beam pivotally connected at an end to the rear axle and at its other end to said compensator, a central, horizontally disposed, principal load-bearing spring means extending between said first and second torque beams, the compensator including a spring means extending between each of said first and second torque beams and said compensator to resist pivoting movement of said torque rods caused by vertical deflection of said axles.

2. The device of claim 1 wherein said central spring means has means to shift loading from one axle to another.

3. The device of claim 2 wherein said load shifting means includes pivoting mounts for each end of said central spring means.

4. The device of claim 3 wherein each of said pivoting mounts includes a self-lubricating bearing surface secured to said central spring and a matching self-lubricating bearing surface secured to said torque beam.

5. The device of claim 3 further comprising means to limit the pivoting of each end of said central spring.

6. The device of claim 5 wherein the pivot limiting means includes a saddle bracket secured to each torque beam, a matching saddle bracket secured to each end of said central spring means, said brackets being aligned with each other, at least one of each pair of said brackets having an arcuate slot, and a bolt extending through said slot and said other bracket of the pair so that said bolt limits the relative movement between the brackets, and hence between the central spring and the corresponding torque beam.

7. The device of claim 2 wherein each torque rod has means to mount an end of said central spring including a stud, each end of said central spring having means defining an axial opening for receiving said stud.

8. The device of claim 1 further comprising means to limit the downward pivoting of said torque beams about said pedestal.

9. The device of claim 8 wherein said pivot limiting means includes a removable set screw.

10. The device of claim 9 wherein the central spring may be removed from the suspension by removing said set screw and raising the vehicle chassis away from the axles to thereby pivot the torque beams away from said central spring.

11. The device of claim 1 wherein two of said suspensions are mounted to opposite sides of the vehicle and further comprising a trunnion shaft extending between the compensators of said suspensions.

12. The device of claim 1 further comprising a shock absorber extending between each of said torque beams and said pedestal.

13. The device of claim 1 wherein the central spring is an elastomeric spring.

14. The device of claim 1 wherein each of said compensator spring means comprises a multiple layered spring having alternate layers of metal and elastomeric material.

15. The device of claim 1 wherein said compensator spring means extends between each of the torque beams and the compensator from a point radially closer to the pivoting connection of its respective torque arm to the compensator than the central spring so that upward pivotal movement of a torque beam includes a greater compressive force on its associated compensator spring than on said central spring.

16. A vehicle suspension assembly for a tandem axle vehicle including a pedestal adapted to be suspended from said vehicle's chassis and between said axles, a trunnion shaft suspended from said pedestal and extending transversely therefrom, a compensator pivotally connected to said trunnion shaft, a first torque beam pivotally connected to the forward axle and pivotally connected to the compensator, a second torque beam pivotally connected to the rear axle and pivotally connected to the compensator, each torque beam having a vertical member extending upwardly therefrom, a central horizontally disposed principal load-bearing spring means extending between said vertical members so that upward movement of the axle with respect to the vehicle chassis pivots its corresponding torque beam and vertical member against the central spring and is resisted thereby, and said compensator having spring means resisting compression of said central spring.

17. The device of claim 16 wherein said compensator spring means comprises a sandwich metal and elastomeric spring extending between each of the vertical members and the compensator from a point radially closer to the pivoting connection of the torque arm to the compensator than the central spring so that upward pivotal movement of a torque beam induces a greater compressive force on its associated sandwich spring than on said central spring.

* * * * *